(No Model.) 2 Sheets—Sheet 1.
J. G. MAHON & C. E. GOWER.
CORN HARVESTER.
No. 594,409. Patented Nov. 30, 1897.
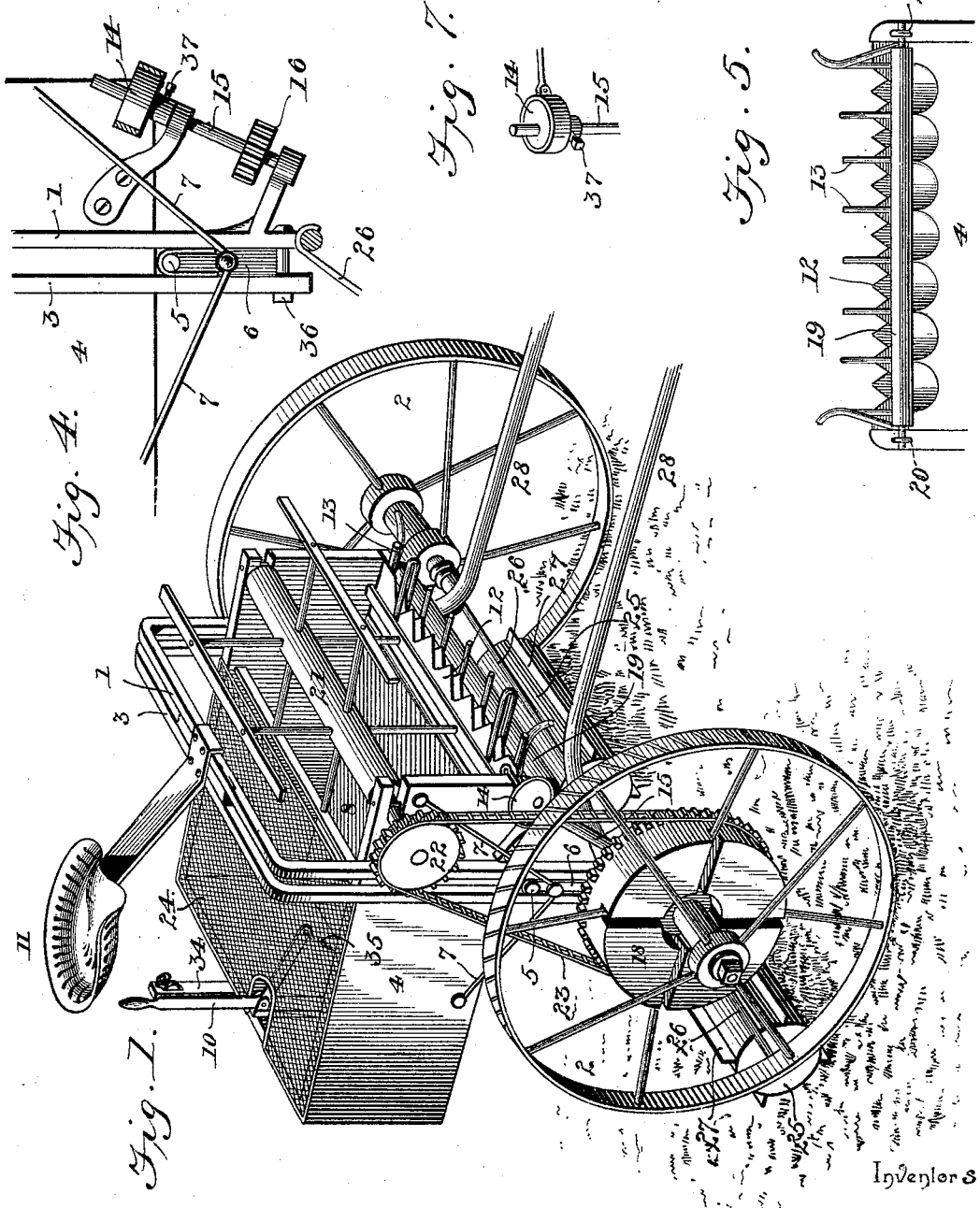
Witnesses
E. N. Monroe
V. B. Hillyard
Inventors
John G. Mahon
Charles E. Gower
By their Attorneys,
C. A. Snow & Co.

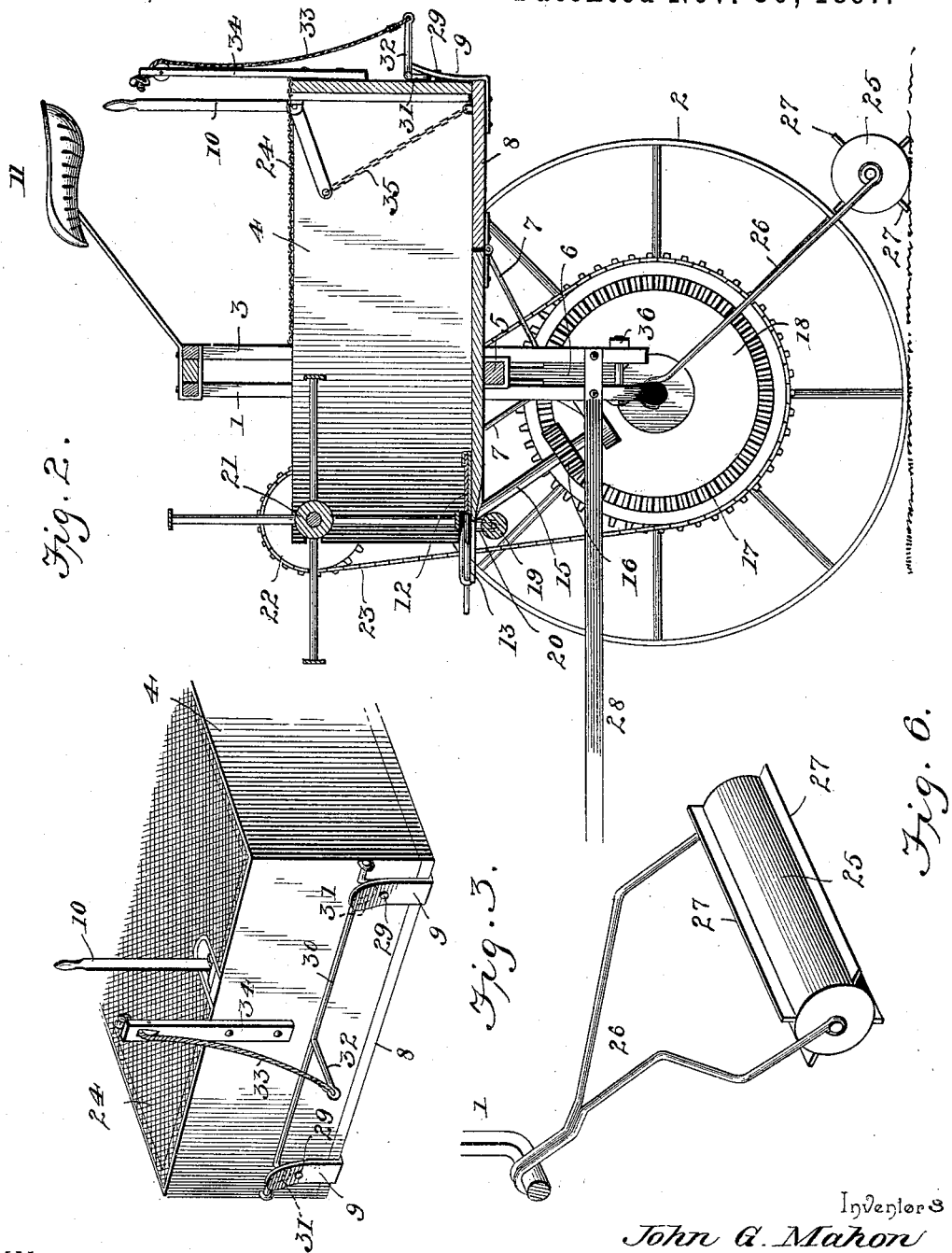

UNITED STATES PATENT OFFICE.

JOHN G. MAHON AND CHARLES E. GOWER, OF BALDWYN, MISSISSIPPI.

CORN-HARVESTER.

SPECIFICATION forming part of Letters Patent No. 594,409, dated November 30, 1897.

Application filed April 13, 1897. Serial No. 631,973. (No model.)

*To all whom it may concern:*

Be it known that we, JOHN G. MAHON and CHARLES E. GOWER, citizens of the United States, residing at Baldwyn, in the county of Lee and State of Mississippi, have invented a new and useful Corn-Harvester, of which the following is a specification.

This invention relates to machines for harvesting corn in the field, whereby the ears are cut or snapped from the stalks and the latter left standing.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of the improved corn-harvester. Fig. 2 is a longitudinal section thereof. Fig. 3 is a rear view of the body in perspective, showing the means for releasing the trap-door. Fig. 4 is a detail view showing more clearly the mechanism for transmitting motion to the cutting apparatus. Fig. 5 is a detail view of the front portion of the body inverted. Fig. 6 is a detail view in perspective of a holding-roller. Fig. 7 is a detail view of the means for imparting a reciprocating movement to the cutting apparatus.

Corresponding and like parts are referred to in the following description and indicated in the several views of the accompanying drawings by the same reference-characters.

The arched axle 1 has ground-wheels 2 loosely mounted upon its spindle-arms, one of the ground-wheels serving to drive the operating parts and having its rim or tread surface provided with spurs or projections to prevent slipping and insure the rotation of the wheel when the machine is advancing to its work. An arched bar 3 is secured to the arched portion of the axle 1 to strengthen and brace it, and the body 4 is supported by means of the arched axle and arched bar in such a manner as to be adjusted vertically to adapt its height to the stand or growth of the crop to be harvested. A transverse bar 5 is secured to the bottom side of the body and its ends project beyond the sides thereof and enter the space formed between the arched bar 3 and the arched portion of the axle 1 and rest upon blocks 6, secured between the parts 1 and 3. Truss-braces 7, consisting of rods or stout wire, have coils intermediate of their ends to receive pins or extensions of the blocks 6 and have their extremities secured to the sides of the body 4 near their front and rear ends.

The body 4 is a box-shaped structure open at its front end and having the rear portion of its bottom hinged at its front end, so as to swing downward at its rear end when it is required to discharge the harvest in a pile to be subsequently gathered in any desired way. The hinged leaf or trap-door 8 is retained in position by catches 9, secured to its rear or free end and adapted to engage with corresponding stops 29, provided on the rear end of the body. A shaft 30 is journaled at its ends in eyes or suitable bearings provided at the rear side of the body 4 and has crank or eccentric portions 31 opposite the catches 9 and between them and the rear portion of the body, and this shaft has a rearwardly-extending arm 32, to which a rope 33 is attached and which passes over a pulley in an upright 34, secured to the body, so as to extend within convenient reach of the driver's seat, whereby a pull upon the rope 33 will rock the shaft 30 and effect a release of the catches 9 from the stops 29, thereby permitting the leaf or trap-door 8 to drop automatically and discharge the load upon the ground without requiring the dismounting of the driver. To reset the trap-door, a bell-crank lever 10 is fulcrumed at its elbow to the body, and its horizontal arm is connected by means of a chain 35 with the free end of the leaf or trap-door, and when it is required to close the same after the load has been dumped it is only necessary to move the vertical arm of the lever 10 rearwardly, when the desired result will be effected.

The front end of the body is open and is supplied with a cutting apparatus 12 of any of the types commonly employed in mowing and harvesting machines, the cutting apparatus acting jointly with guard-fingers 13, which retain the stalks in place while the cutting apparatus severs the ears therefrom. The cutting apparatus, as usual, is composed of a relatively-fixed cutter-bar and a movable cutter-bar, the latter being reciprocated by means of an eccentric 14, having adjustable connection with the upper end of a shaft 15, journaled in bearings provided at one side of the machine, said shaft having a pinion 16 at its lower end intermeshing with cogs 17 on the inner side of a sprocket-wheel 18, secured to or formed with the drive-wheel 2. A clearing-roller 19 is located immediately below the cutting apparatus, and its journals obtain bearings in slotted hangers 20, whereby the said roller has a limited vertical movement in addition to its rotation upon its journals. The stalks come in contact with the clearing-roller and are thereby enabled the more readily to pass by the cutting apparatus without wedging into the angular space formed between the teeth or knives of the cutter-bars, which would result if the roller 19 were not provided.

A reel 21 of ordinary construction is journaled at its ends in the side pieces of the body 4 and operates directly above the cutting apparatus and at the front end of the body, and one of its journals is extended and provided with a sprocket-pinion 22, around which passes a sprocket-chain 23, by means of which the reel is rotated from the sprocket-wheel 18. The beater-bars of the reel travel rearwardly over the cutting apparatus and act jointly therewith to snap the ears of corn from the stalks and throw the said ears into the body. To prevent the ears being thrown over the rear end of the body, a guard or cover 24 extends over the rear portion of the body and is of wire fabric for lightness and to enable the driver to see when to dump the load.

The ears of corn are not always located so as to reach the cutting apparatus, and such ears are snapped from the stalks by being struck by a bar of the reel. It will thus be seen that the machine both cuts and snaps the ears from the stalks. The ears facing the machine will easily reach the cutting apparatus and be severed from the stalks, whereas those facing away from the machine will be snapped from the stalks.

In operating machines of this type inconvenience and annoyance have been occasioned by the uprooting of the stalks, thereby necessitating a stopping of the team and a dismounting of the driver for the purpose of freeing the machine of the stalks torn up by the roots. To obviate this difficulty, rollers 25 are journaled in frames 26, and the latter are coupled to a convenient portion of the machine, preferably the horizontal portions of the arched axle. These rollers are made sufficiently heavy, so as to press upon the lower ends of the stalks and prevent the machine tearing them up by the roots. Longitudinal blades 27 are disposed about the rollers and engage positively with the stalks and prevent any slipping of the latter should the machine tend to pull them up by the roots. These rollers 25 are located in the rear of the cutting apparatus a proper distance, which experience will determine, so that they will engage with the lower ends of the stalks at the same time the cutting apparatus is operating to sever the ears therefrom.

The machine may be constructed to operate upon any number of rows at the same time and is drawn over the field by hitching a team thereto, and, as shown, thills 28 are secured to the body 4 and a single horse is to be hitched thereto, the horse walking in the space between two rows, while the latter are stripped of the ears by the machine in the manner set forth. These thills are secured at their inner ends to the vertical portions of the crank-axle at or near their lower ends, whereby the arched portion is held vertically and the body horizontally.

When it is required to move the body 4 vertically to adapt its elevation to the stand or height of corn to be harvested, the bolts 36, securing the parts 1 and 3, are loosened and the blocks 6 moved in the space formed between the parts 1 and 3, and are secured in the desired position by retightening the bolts 36 previously loosened. The sprocket-chain 23 is lengthened or shortened, as the case may be, according to the distance apart of the parts 18 and 22, and the eccentric 14 is moved on the shaft 15 by loosening the binding-screw 37 and again tightening it for fastening the eccentric 14 in its new position.

Having thus described the invention, what is claimed as new is—

1. In a corn-harvester, the combination with the cutting or harvesting mechanism, of a clearing-roller located immediately below the cutting mechanism and mounted in slotted hangers, substantially as set forth.

2. In a corn-harvester, the combination of an arched axle, an arched bar secured to the arched portion thereof, blocks interposed between the arched bar and arched axle, a body having lateral extensions resting upon the said blocks, and truss-braces having connection at their ends with the body upon opposite sides of the end portions of the arched bar and axle and intermediate of their ends with the aforesaid blocks, substantially as set forth.

3. A corn-harvester comprising a body open at its front and having the rear portion of its bottom hinged to open downward and discharge the load, a cutting apparatus at the front end of the body, a clearing-roller below the cutting apparatus, a reel operating over the cutting apparatus, and rollers operating in the rear of the harvesting mechanism to engage with the lower ends of the stalks and prevent their uprooting, substantially as set forth.

In testimony that we claim the foregoing as our own we have hereto affixed our signatures in the presence of two witnesses.

JOHN G. MAHON.
CHARLES E. GOWER.

Witnesses:
J. M. LYTAL,
H. W. BUCY.